United States Patent [19]

Nishimura et al.

[11] Patent Number: 4,809,113
[45] Date of Patent: Feb. 28, 1989

[54] TAPE CASSETTE WITH IMPROVED COVER STRUCTURE

[75] Inventors: Akihiro Nishimura, Higashiosaka; Masao Kawagishi, Nara; Hideki Sakumoto; Masahiko Matsui, both of Katano; Yoshinori Shiomi, Tsuyama, all of Japan

[73] Assignee: Matsushita Electric Industrial Co., Ltd., Osaka, Japan

[21] Appl. No.: 36,970

[22] Filed: Apr. 10, 1987

[30] Foreign Application Priority Data

Apr. 11, 1986 [JP] Japan ................................ 61-84505

[51] Int. Cl.[4] .......................................... G11B 23/08
[52] U.S. Cl. .................................................. 360/132
[58] Field of Search ....................... 360/132; 242/198

[56] References Cited

U.S. PATENT DOCUMENTS 4,698,713  10/1967  Kawada ............................... 360/132
4,701,822  10/1987  Oishi et al. .......................... 360/132

FOREIGN PATENT DOCUMENTS 61-68786  4/1986  Japan ................................... 360/132

Primary Examiner—Robert S. Tupper
Attorney, Agent, or Firm—Wenderoth, Lind & Ponack

[57] ABSTRACT

A tape cassette for use in a video tape recorder or the like, which includes a cassette main body having an upper case and a lower case fitted to each other to define the main body, and a front cover movably mounted on the cassette main body for covering a magnetic tape stretched along a front face of the cassette main body, and is characterized in that there are provided a protrusion formed at the lower portion of the front cover so as to extend in a direction toward the lower case, and a corresponding protruding portion formed on the lower case so as to extend in a direction toward the magnetic tape, and thus, upon closure of the front cover, the protrusion of the front cover is adapted to be located at a position below the protruding portion of the lower case.

2 Claims, 6 Drawing Sheets

TAPE CASSETTE WITH IMPROVED COVER STRUCTURE

BACKGROUND OF THE INVENTION

The present invention generally relates to a cassette and more particularly, to a tape cassette for use in a recording and reproducing apparatus such as a video tape recorder or the like, and also in various information processing apparatuses, etc.

Recently, tape cassettes of various types or formats closely resembling each other have come to appear on the market, and there have been increasing cases where a tape cassette of one specific type is incorrectly inserted or loaded, for example, into a video tape recorder (referred to as a VTR hereinafter) of a different format by mistake. Accordingly, it has been required to provide the tape cassettes with a means to completely prevent such incorrect insertion as referred to above.

In FIG. 1, there is shown a conventional tape cassette C for use, for example, in a VTR. The tape cassette C generally includes a cassette main body 3 having an upper case 3a and a lower case 3b fitted to each other to define an opening 4 at a front side of said main body 3, tape supply and take-up reels 2 on which is wound a magnetic tape 5 and rotatably incorporated within said main body 3, with the magnetic tape 5 being stretched between said reels along tape slackening preventing members 3e and 3f in said opening 4, and a front cover 6 movably or pivotally mounted on the main body 3 along the opening 4 for selective opening or closing of said opening so as to cover the front face of said magnetic tape when closed.

FIG. 2 shows a front portion of a tape cassette holder 7 in a VTR of a type in which the tape cassette C of FIG. 1 can not be loaded for recording or reproduction. The tape cassette holder 7 has a lateral width larger than the longitudinal length of the tape cassette C, and is provided at its central portion, with a projection 7a for prevention of reverse insertion of a tape cassette capable of being recorded or reproduced by the above VTR in FIG. 2, or insertion of a tape cassette incapable of being recorded or reproduced by said VTR. When a tape cassette of an improper type is to be inserted into the holder 7 by mistake, the projection 7a contacts the front cover 6 of the tape cassette C to obstruct the loading of said tape cassette.

Problems related to the conventional tape cassette C referred to above will be described in more detail with reference to FIGS. 3 to 6.

FIGS. 3 and 4 are fragmentary cross sections showing on an enlarged scale, the portion at the opening 4a of the tape cassette main body 3, while FIGS. 5 and 6 also show fragmentary cross sections at the portion where the projection 7a contacts the tape cassette main body 3 at the opening 4b.

As shown in FIG. 3, in the state where the front cover 6 is closed, the forward edge of a protrusion 6a formed at the lower portion of the front cover 6 is held in contact with the outer edge of the projection 3d on the bottom of the tape slackening preventing member 3f and in line with the bottom of the lower case 3b. In this state, when it is attempted to forcibly insert the tape cassette C into the tape cassette holder 7, the front cover 6 collides with the projection 7a so as to be deformed as shown in FIGS. 4 and 6. However, since the clearance between the upper inner side 6b of the front cover 6 and the front upper side 3c of the upper case 3a is small, said upper inner side 6b and front upper side 3c are brought into contact with each other upon starting of deformation of the front cover 6 downwardly, and thus, such downward deformation of the front cover 6 does not actually take place. Conversely, said front cover 6 is deformed in an upward direction due to the fact that there is no particular member provided for strongly correcting such upward deformation. Therefore, a gap is formed between the underface of the cassette main body 3 and the underface of the front cover 6, and at the opening portion 4b where the main body 3 contacts the projection 7a of the cassette holder 7, said projection 7a is forced into the gap referred to above as shown in FIG. 6.

In the above case, the inner side of the front cover 6 and the protrusion 6a thereof strongly contact the magnetic tape 5, thus resulting in damage to the magnetic tape 5. Moreover, if the tape cassette C is taken out, with the projection 7a of the cassette holder 7 held within the opening 4b, the front cover 6 strongly contacts the projection 7a, inviting such a serious problem as breakage of the front cover 6 in the worst case.

Furthermore, there is also such a problem that, in the case where the front face and underface of the front cover 6 of the tape cassette C collide with the ground or the like due to dropping, the front cover 6 is deformed in the upward direction so that the protrusion 6a contacts the magnetic tape 5, thus also resulting in tape damage.

SUMMARY OF THE INVENTION

Accordingly, an essential object of the present invention is to provide an improved tape cassette which is capable of preventing incorrect insertion thereof into a video tape recorder or the like of a different format or type, with a simultaneous protection against any damage to the magnetic tape due to dropping, impact, etc.

Another important object of the present invention is to provide a tape cassette of the above described type which has a simple construction and is accurate in functioning, and can be readily manufactured at low cost.

In accomplishing these and other objects, according to one preferred embodiment of the present invention, there is provided a tape cassette which includes a cassette main body having an upper case and a lower case fitted to each other to define the main body, and a cover member movably mounted on the cassette main body for covering a magnetic tape stretched along a front face of the cassette main body, and is characterized in that there are provided a protrusion formed at the lower portion of the cover member so as extend in a direction toward the lower case, and a corresponding protruding portion formed on the lower case so as to extend in a direction toward the magnetic tape, and is also characterized in that, upon closure of the cover member, the protrusion of the cover member is adapted to be located at a position lower than the protruding portion of the lower case.

Thus, according to the present invention, since the protrusion of the cover member is lower than the protruding portion of the lower case when the cover member is closed, the cover member is not readily deformed even if it is brought into contact with some external member or subjected to dropping or application of impacts thereto. Furthermore, troubles taking place in the conventional tape cassettes such as the incorrect loading of a tape casing into a VTR of a different format, or tape damage caused by dropping of the tape cassette, etc. may be advantageously prevented.

BRIEF DESCRIPTION OF THE DRAWINGS

These and other objects and features of the present invention will become apparent from the following description of a preferred embodiment thereof taken with reference to the accompanying drawings, in which.

DETAILED DESCRIPTION OF THE INVENTION

Figure 1:
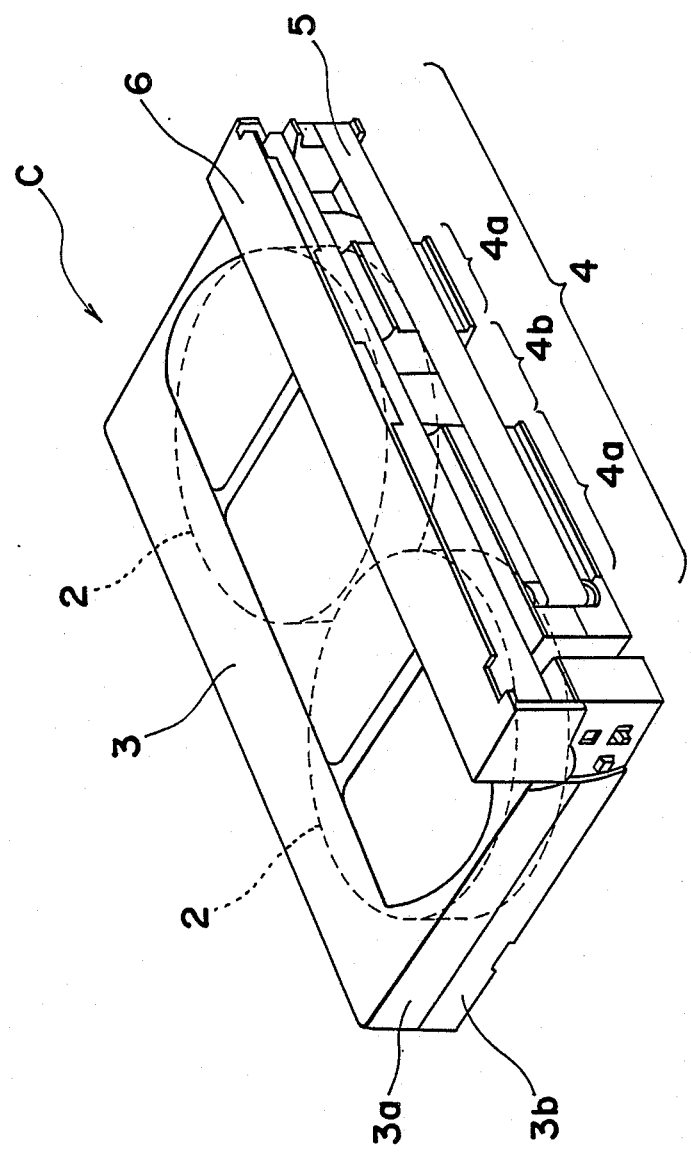
FIG. 1 is a perspective view of a conventional tape cassette.

Before the description of the present invention proceeds, it is to be noted that like parts are designated by like reference numerals throughout the accompanying drawings, and a detailed description thereof is abbreviated for brevity.

Figure 10:
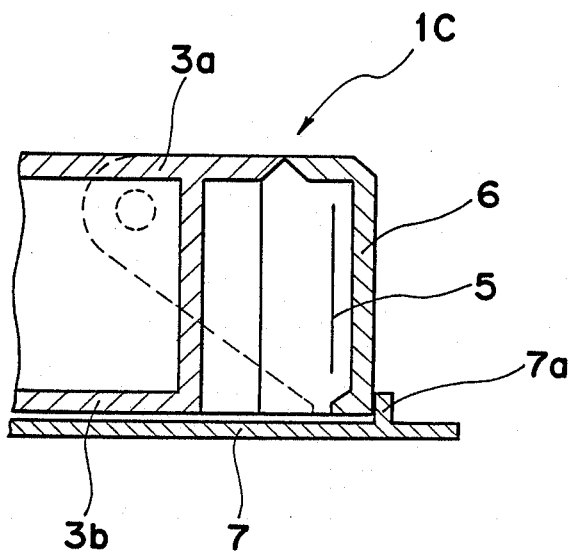
Figure 11:
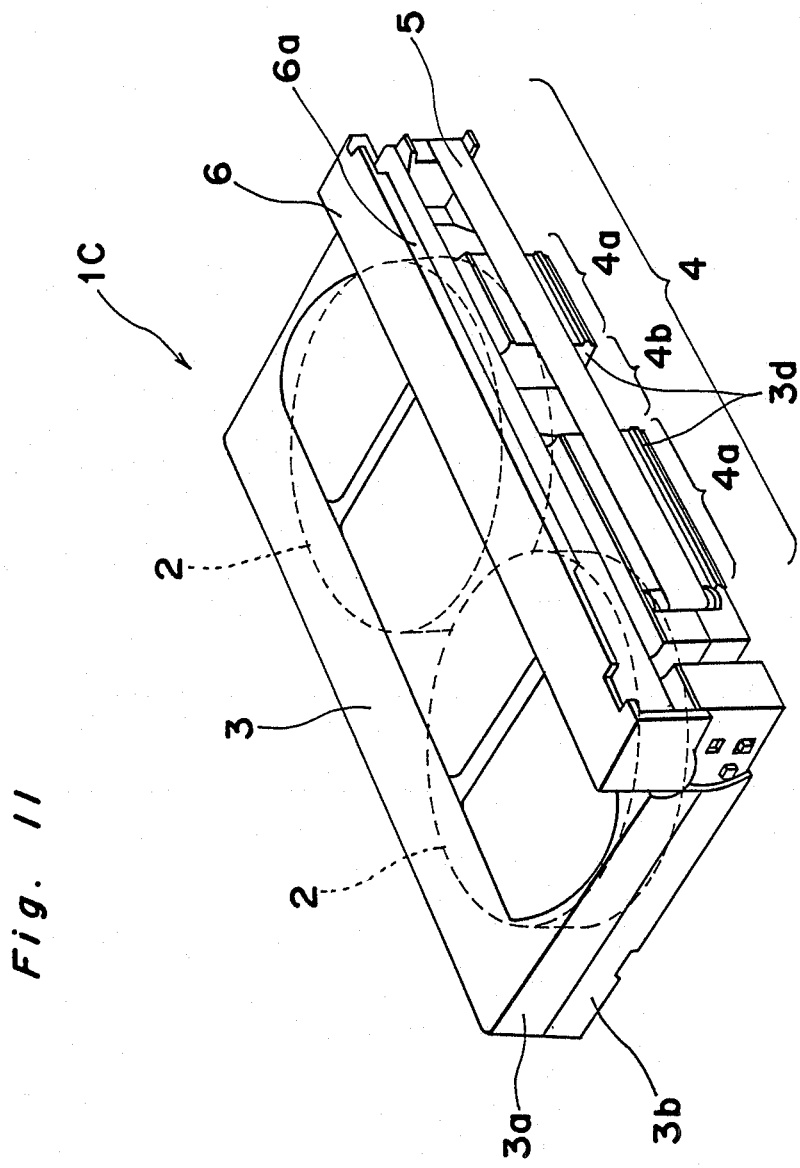
FIG. 11 is a perspective view of the tape cassette according to the present invention.

Referring now to FIGS. 7 to 11, there is shown in FIG. 11 an improved tape cassette 1C according to one preferred embodiment of the present invention.

Generally, in a similar manner to the conventional tape cassette C described earlier with reference to FIG. 1, the tape cassette 1C of the present invention also comprises the cassette main body 3 having the upper case 3a and the lower case 3b fitted to each other to define the opening 4 at the front side of said main body 3, the tape supply and take-up reels 2 on which is wound the magnetic tape 5 and rotatably incorporated within said main body 3, with the magnetic tape 5 being stretched between said reels along the tape slackening preventing members 3e and 3f in said opening 4, and the front cover 6 movably or pivotally mounted on the main body 3 along the opening 4 for selective opening or closing of said opening so as to cover the front face of said magnetic tape when closed.

However, the tape cassette 1C of the present invention is particularly characterized in that the lower portion of the front cover 6 at the opening 4a and the lower portion of the lower case 3b are formed to have cross sections as described hereinbelow with reference to FIGS. 7 to 10.

Figure 2:
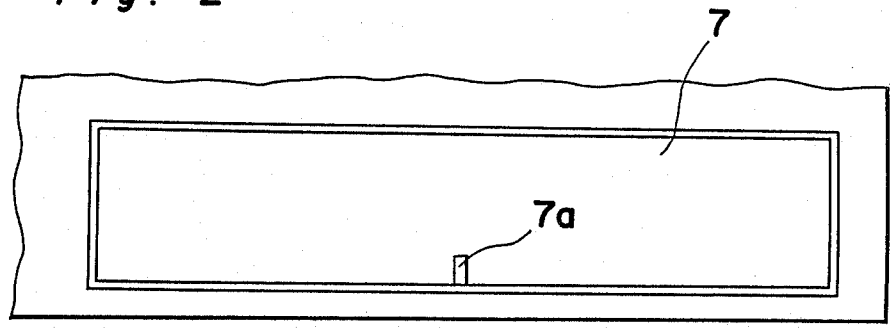
FIG. 2 is a front elevational view of a cassette holder in a video tape recorder main body.
Figure 3:
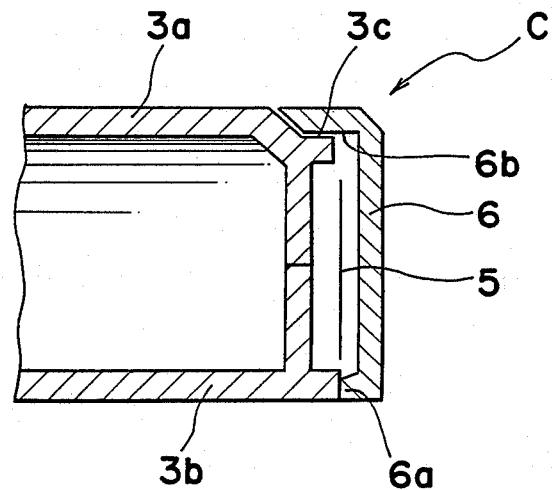
FIGS. 3 and 4 show fragmentary cross sections, on an enlarged scale, at the front portion of the tape cassette in FIG. 1.
Figure 4:
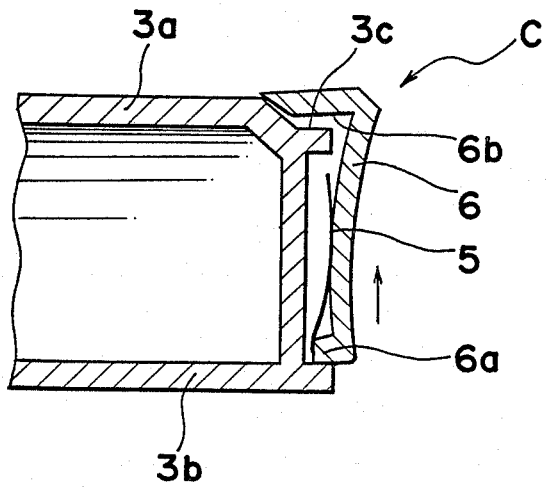
Figure 5:
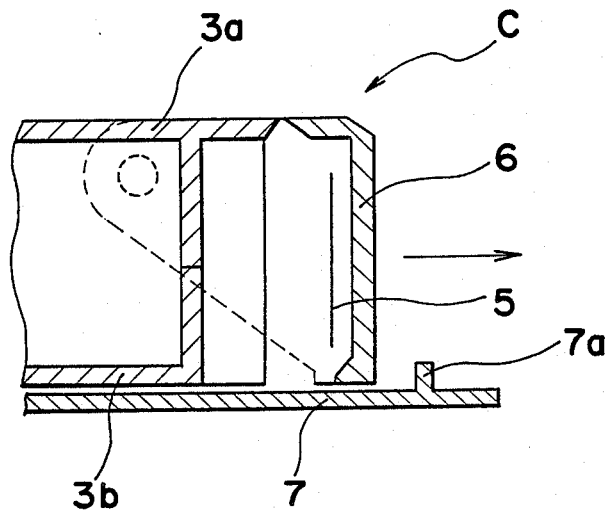
FIGS. 5 and 6 show fragmentary cross sections, on an enlarged scale, of the tape cassette in FIG. 1 as inserted in the cassette holder of FIG. 2.
Figure 6:
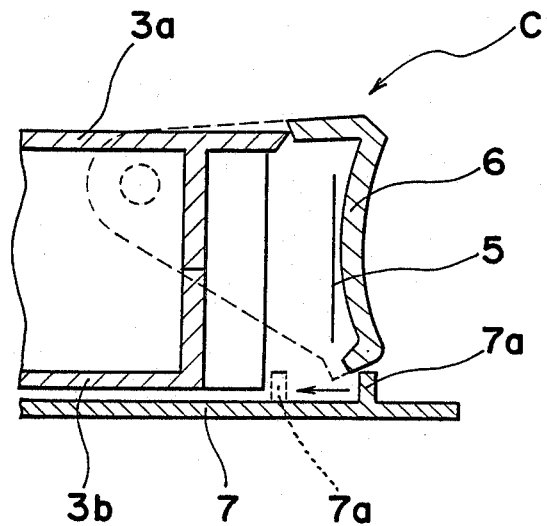
Figure 7:
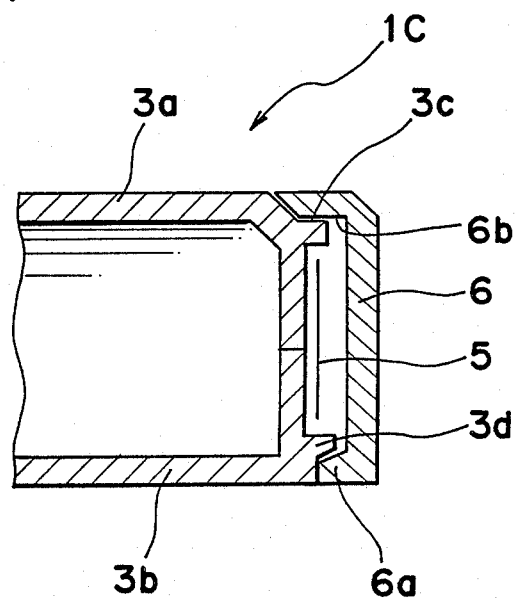
FIGS. 7 and 8 show fragmentary cross sections on an enlarged scale, at the front portion of a tape cassette as shown in FIG. 11 according to one preferred embodiment of the present invention.
Figure 8:
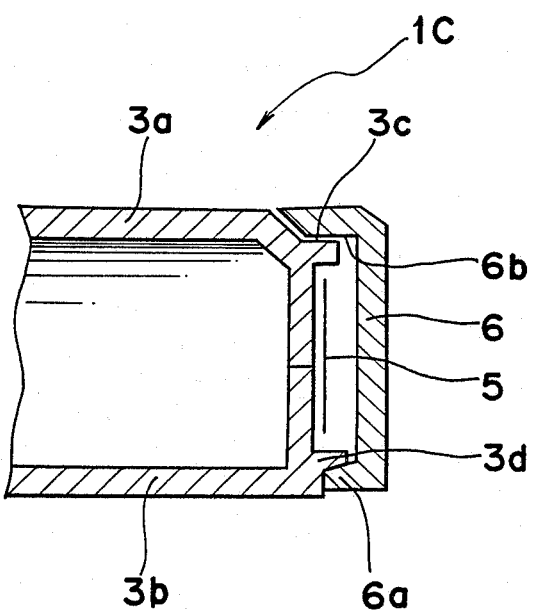
Figure 9:
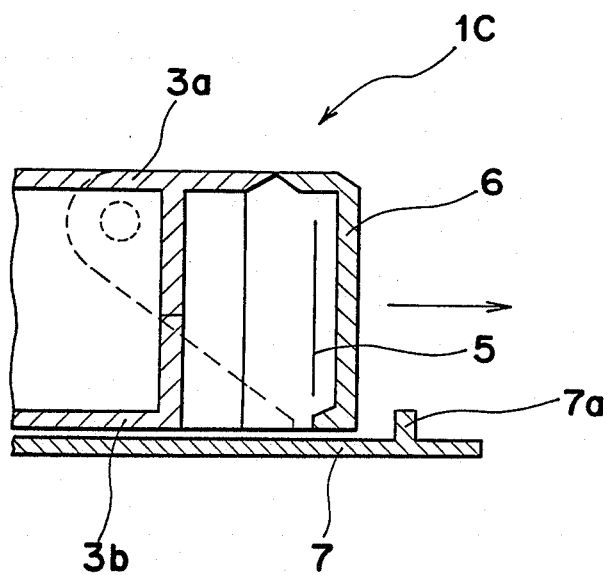
FIGS. 9 and 10 show fragmentary cross sections, on an enlarged scale, of the tape cassette in FIG. 11 as inserted in the cassette holder.

More specifically, as shown in FIG. 7, in a state where the front cover 6 is closed, a protrusion 6a formed is provided at the lower portion of the front cover 6 and has an inclined face along its upper surface. The projection 3d provided on the lower portion of the slackening preventing member 3f is spaced upwardly from the bottom of the lower case 3b so as to extend toward the magnetic tape 5 and also having an inclined face along the under surface thereof. In the normal closed position of the cover 6, the upper surface of the protrusion 6a is spaced from the under surface of projection 3d', and the position of the pivot axis 6p for the cover 6 is offset towards the upper part of said main body such that when the cover swings between the closed position as shown in FIG. 7 and an open position, the protrusion 6a will not contact projection 3d'. In the above state, when it is attempted to forcibly insert the tape cassette 1C into the cassette holder 7 (FIG. 2) as described with reference to the conventional tape cassette C of FIG. 1, the front cover 6 collides with the projection 7a and is urged to be deformed in an upward direction as shown in FIGS. 8 and 10, but owing to the fact that the forward edge and the inclined face of the protrusion 6a engage the corresponding lower edge and the inclined face of the protruding portion 3d, the upward deformation of the front cover 6 is advantageously prevented.

As is clear from the foregoing description, according to the tape cassette of the present invention, the protrusion 6a is provided on the front cover 6, while the protruding portion 3d is formed on the lower case 3b so that, when an external member contacts the lower edge of the front cover 6 or said front cover is subjected to an external force equivalent to that in the above contacting state, the protrusion 6a engages the corresponding protruding portion 3d and the lower edge of the lower case 3b, whereby the troubles taking place in the conventional tape cassettes such as mis-loading of the tape cassette into a VTR of a different type, and damage to the tape cassette due to dropping thereof, etc. may be advantageously prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A tape cassette which comprises: a cassette main body having a front face with tape slackening preventing members on said front face, projections on the upper and lower edges of said tape slackening preventing members projecting outwardly of said front face, the projections on the lower edges being spaced upwardly from the bottom of said main body; a magnetic tape in said cassette main body and extending along and exposed at said front face of said cassette main body so as to be engagable with said tape slackening preventing members; and a cover member pivotably mounted on said cassette main body about a pivot point offset towards the upper part of said main body from a central portion in the direction of the thickness of said main body and so as to be pivotable between a closed position, where said cover member covers said front face, and an open position, said cover member having a protrusion on the lower edge thereof which, when said cover member is in the closed position, protrudes toward said front face and contacts the front face of said tape slackening preventing members below said projections and is spaced from the under surface of said projections, the forward edge of said projections on said tape slackening preventing members, when said cover member is in the closed position, being spaced from said cover member.

2. A tape cassette as claimed in claim 1 in which said projections and protruding portion have respective inclined faces which are opposed to each other.

* * * * *